US008678063B2

(12) United States Patent
Baumbusch et al.

(10) Patent No.: US 8,678,063 B2
(45) Date of Patent: Mar. 25, 2014

(54) APPLICATOR ROLL FOR A LABELING APPARATUS

(75) Inventors: Michael Baumbusch, Hirschhorn (DE); Michael Rapp, Modautal (DE); Ulrich Silberzahn, Igelsbach (DE)

(73) Assignee: Checkpoint Systems, Inc.

( * ) Notice: Subject to any disclaimer, the term of this patent is extended or adjusted under 35 U.S.C. 154(b) by 1258 days.

(21) Appl. No.: 11/572,103

(22) PCT Filed: Jul. 12, 2005

(86) PCT No.: PCT/US2005/024735
§ 371 (c)(1),
(2), (4) Date: May 14, 2008

(87) PCT Pub. No.: WO2006/017307
PCT Pub. Date: Feb. 16, 2006

(65) Prior Publication Data

US 2008/0202695 A1 Aug. 28, 2008

(30) Foreign Application Priority Data

Jul. 13, 2004 (DE) ......................... 10 2004 033 882

(51) Int. Cl.

| | |
|---|---|
| ***B65C 9/18*** | (2006.01) |
| ***B29C 65/00*** | (2006.01) |
| ***B32B 37/00*** | (2006.01) |
| ***B31F 5/00*** | (2006.01) |
| ***B65C 9/08*** | (2006.01) |
| ***B27G 11/00*** | (2006.01) |
| ***B44C 7/00*** | (2006.01) |
| ***E04D 15/00*** | (2006.01) |

(52) U.S. Cl.
USPC ........... 156/542; 156/552; 156/558; 156/569; 156/576; 156/577; 156/579

(58) Field of Classification Search
USPC ........... 156/60, 230, 238, 247, 249, 289, 297, 156/299, 324, 701, 719, 349, 538, 539, 540, 156/541, 542, 543, 552, 553, 556, 558, 569, 156/574, 576, 577, 579, 580, 581, 582
See application file for complete search history.

(56) References Cited

U.S. PATENT DOCUMENTS

| | | | | |
|---|---|---|---|---|
| 4,486,258 | A | 12/1984 | Schrotz et al. | |
| 4,737,223 | A | 4/1988 | Koch | |
| 6,237,664 | B1 | 5/2001 | Becker | |
| 6,901,856 | B1 * | 6/2005 | Schneider et al. | 101/350.3 |

FOREIGN PATENT DOCUMENTS

| | | | |
|---|---|---|---|
| EP | 0200932 | A | 11/1986 |
| EP | 0976658 | A1 | 2/2000 |

OTHER PUBLICATIONS

International Search Report for corresponding PCT/US2005/024735.

* cited by examiner

*Primary Examiner* — Philip Tucker
*Assistant Examiner* — Brian R Slawski

(57) ABSTRACT

An applicator roll (1) is described for a labeling apparatus for paying out and applying self-adhesive labels, which with each operating cycle moves one self-adhesive label into a dispensing position underneath an applicator roll. Depending on the printing mechanism used in the labeling apparatus, whether printing an even or an odd number of digits, it is advantageous to arranged a profiled ring (32) formed on a sleeve (31) of the applicator roll (1) in the center or off center. In addition, label formats of different widths require applicator rolls of different widths. These problems are solved in the applicator roll (1) described here in that its sleeve (31) supports two cylindrical jackets (34) on either side of the profiled ring (32). The cylindrical jackets (34) are axially displaceable on the sleeve (31) and can be releasably, positively locked in several positions against axial shifting, preferably by mutual engagement of an annular collar (38) and an annular groove (40). In this way, the applicator roll (1) can be adapted to printing mechanisms with even or odd numbers of digits and to labels of different widths.

16 Claims, 2 Drawing Sheets

FIG. 1a
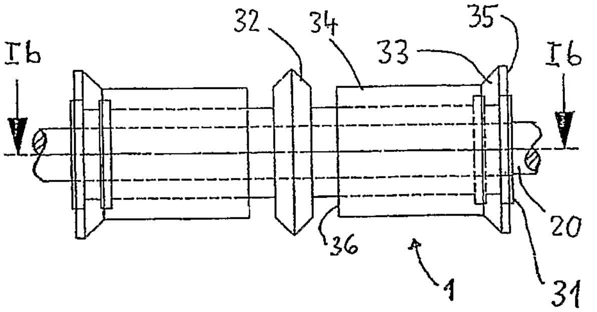
FIG. 1b
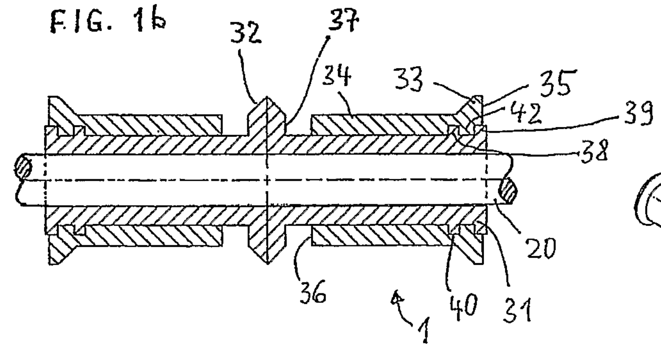
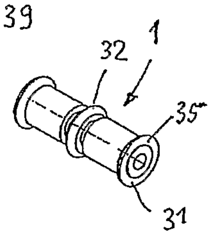
FIG. 1c
FIG. 2a
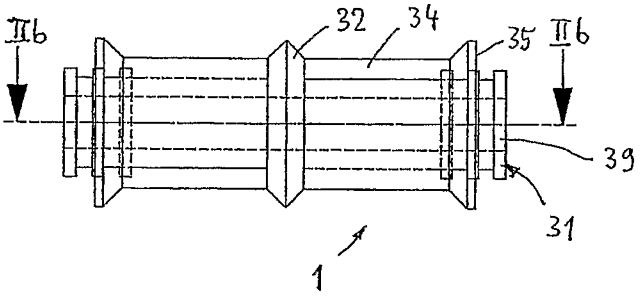
FIG. 2b
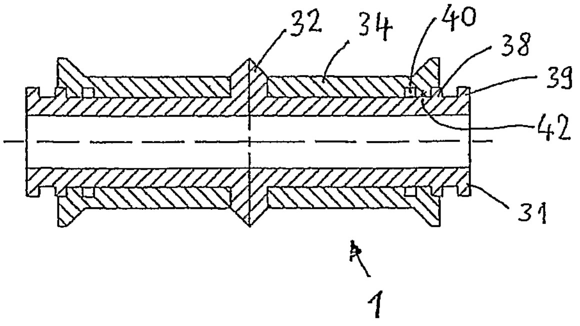
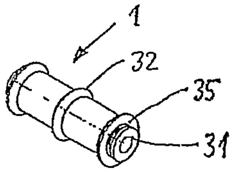
FIG. 2c

APPLICATOR ROLL FOR A LABELING APPARATUS

CROSS-REFERENCE TO RELATED APPLICATIONS

This national stage application claims the benefit under 35 U.S.C. §371 of International Application No. PCT/US05/024735 filed on Jul. 12, 2005, which in turn takes its priority from German Application No. 10 2004 033 882.5 filed on Jul. 13, 2004, and all of whose entire disclosures are incorporated by reference herein.

BACKGROUND OF THE INVENTION

1. Field of the Invention

This invention relates to an applicator roll for a labeling apparatus for paying out and applying self-adhesive labels, with which in each operating cycle a self-adhesive label in a dispensing position can be adhered to an object through a rolling action of the applicator roll, having a sleeve via which the applicator roll is rotatably mounted on a hub of the labeling apparatus, wherein the sleeve has two cylindrical jackets and is equipped with at least one profiled ring arranged between the cylindrical jackets and projecting radially outwardly beyond the cylindrical jackets.

2. Description of Related Art

An applicator roll and a labeling device of this type are known from EP-B-0 976 658. In the labeling apparatus each self-adhesive label is printed with data directly before it is dispensed. The ink used for the printing does not dry by evaporating but by penetrating the label material. In spite of the fast sequence of operations during the labeling of articles the lateral surface of the applicator roll must not come into contact with printed characters which are not yet dry. This is because the soft plastic material of the lateral surfaces tends to pick up ink without absorbing it. The consequence of this would be that when that part of the lateral surface moistened with ink next came into contact with a label or with the surface of the article to be labeled, it would leave ink there. The result of this would be that the print on the label would be smeared and rather unattractive streaks would appear on the printed labels. To prevent this from happening, the sleeve in the known labeling apparatus is provided with at least one profiled ring which projects radially outwardly beyond the cylindrical jackets. Since the profiled ring and the sleeve are made of a material which is harder than the cylindrical jacket and therefore repels ink, the printed data on the label is not smeared by the profiled ring. To simplify production the profiled ring is integrally formed with the sleeve. Possible materials for the sleeve and the profiled ring are in particular relatively hard plastic such as Teflon, whereas the preferred choice for the cylindrical jackets is a relatively soft material, particularly rubber or plastic.

The profiled ring of the sleeve is positioned advantageously (in the axial direction of the sleeve) at a point where the printing mechanism of the labeling apparatus does not print any data on the label and hence no printed data can be smeared. With a printing mechanism having an even number of digits (such as six or eight), such a position is at the exact center of the sleeve, meaning that a profiled ring set in exactly central position is advantageous. However, if the printing mechanism has an odd number of digits such as seven digits, it makes sense to shift the profiled ring somewhat out of center in the axial direction of the sleeve, so that its position coincides with a space between two printing bands. The labeling apparatuses then have to be supplied with applicator rolls specially adapted to the particular printing mechanism. The applicator rolls then have to be kept on stock and interchangeable not only for adaptation to the different printing mechanisms, but also for adaptation to label formats of different widths. This increases manufacturing costs as well as the cost of operating the labeling apparatus.

A further applicator roll of the art, which is known from EP 0 200 932 B1, can be adapted to the label format. To this end the cylindrical jackets are capable of being releasably and positively locked in a plurality of positions against axial shifting, by displacement on the axis and by insertion of spacing rings. However, this is costly in terms of manufacturing and operation.

BRIEF SUMMARY OF THE INVENTION

The aim of the present invention is to improve an applicator roll of the type described above so as to reduce manufacturing and operating costs of the labeling apparatuses.

This aim is achieved in accordance with the invention with a labeling apparatus of the type described above, by having at least one of the cylindrical jackets be axially displaceable on the sleeve and capable of being releasably and positively locked in a plurality of positions against axial shifting.

Through the axial displaceability of at least one of the cylindrical jackets—preferably, both cylindrical jackets of the applicator roll according to the invention are axially displaceable and also can be releasably and positively locked against axial displacement—it is possible to adapt the effective length of the applicator to label formats of different widths. By axially shifting only one cylindrical jacket of an applicator roll, the profiled ring of the sleeve can be brought into an off-center position and thus the applicator roll can be adapted to different printing mechanisms, to keep the profiled ring from causing streaks on the freshly printed label. The adaptability of one and the same applicator roll to different printing mechanisms and to label formats of different widths substantially lowers production and operating costs.

Advantageous embodiments of the applicator roll according to the invention are represented by the subject matter of the subordinate claims.

If in one embodiment of the applicator roll according to the invention, to create a positive lock between the sleeve and the at least one cylindrical jacket, at least one first annular collar can be caused to engage in at least one first annular groove, with the at least first annular collar being formed on the sleeve and the at least first annular groove being formed in the at least one cylindrical jacket, or with the at least first annular collar being formed on the at least one cylindrical jacket and the at least first annular groove being formed in the sleeve, then a secure positive lock can be simply produced between each cylindrical jacket and the sleeve in the desired axial positions of the cylindrical jacket on the sleeve. It is merely necessary to produce a corresponding number of annular collars on the sleeve or on the cylindrical jackets, the collars being capable of engaging in corresponding annular grooves in the cylindrical jackets or in the sleeve. In the case of a wide label format the cylindrical jackets are simply axially displaced outwardly on the sleeve and then locked in the desired axial positions. If only one cylindrical jacket is axially displaced, or if both cylindrical jackets of an applicator roll are axially displaced by different distances, then the profiled ring of the sleeve can easily be shifted to an off-center position for adaptation to different printing mechanisms.

If in a further embodiment of the applicator roll according to the invention, the sleeve is equipped with the first annular collar at a distance from the profiled ring and the at least one cylindrical jacket is provided with the first annular groove, then each cylindrical jacket can be locked in a desired axial position through engagement of an annular collar in an annular groove.

If in a further embodiment of the applicator roll according to the invention the first annular collar on the sleeve is spaced from the profiled ring such that the at least one cylindrical jacket is axially lockable between the profiled ring and the first annular collar, then a further positive locking possibility exists, since the entire cylindrical jacket is accommodated by a wide annular groove formed between the profiled ring and the first annular collar.

If in a further embodiment of the applicator roll according to the invention the sleeve is provided with a second annular collar spaced apart from the first annular collar, with the distance between the two annular collars being such that they can accommodate between them a third annular collar formed on the at least one cylindrical jacket between its first annular groove and its outer end, then an additional axial securing means exists for the releasable, positive locking capability of the cylindrical jacket. This is because two annular collars each, which are provided on the sleeve or on the cylindrical jacket, respectively, achieve mutual engagement with two annular grooves provided in the sleeve or in the cylindrical jacket.

If in a further embodiment of the applicator roll according to the invention the sleeve and the profiled ring are made of plastic, then the sleeve is easy to produce in one piece, for instance as an injection-molded piece.

If in another embodiment of the applicator roll according to the invention the profiled ring is arranged on the sleeve approximately in the center or off center in the longitudinal direction of the sleeve, and if in a further embodiment of the applicator roll according to the invention the cylindrical jackets are each provided with a fourth annular collar projecting radially outwardly, the result is a symmetrical arrangement of the profiled ring and the annular collars, and thus an optimal pressing of the label on the particular object. Even when the labeling apparatus is slightly tilted to the side, the dispensed label can still be applied correctly to the article thanks to the elasticity of the annular collars of the cylindrical jackets. The fourth annular collars here are attached to the cylindrical jackets at places where they generally do not come into contact with the printed parts of the label, these being, for example (in the longitudinal direction of the sleeve) on the outside or adjacent to the outer end faces of the cylindrical jackets, where they come into contact with the unprinted margins of a label.

If in further embodiments of the applicator roll according to the invention the sleeve and the profiled ring are made of a material that is harder than the cylindrical jackets and thus the profiled ring is made of an ink-repellent material, the avoidance of streaking becomes even more certain.

If an a further embodiment of the applicator roll according to the invention the cylindrical jackets are comprised of a soft rubber or plastic, then a self-adhesive label can be securely applied to an article to be labeled, even under difficult conditions.

If in a further embodiment of the applicator roll according to the invention the fourth annular collars are integrally formed with the cylindrical jacket or with each cylindrical jacket, then the cylindrical jackets, too, can be produced in a simple manner.

BRIEF DESCRIPTION OF SEVERAL VIEWS OF THE DRAWING

Embodiments of the invention will be explained in more detail below with reference to the accompanying drawings.

FIGS. 1$a$, 1$b$ and 1$c$ show respectively a lateral view, a longitudinal sectional view and a perspective view of an embodiment of an applicator roll according to the invention, set for a wide label format;

FIGS. 2$a$, 2$b$ and 2$c$ show the same views of the applicator roll according to the invention as in FIGS. 1$a$, 1$b$ and 1$c$, but set for a narrow label format.

DETAILED DESCRIPTION OF THE PREFERRED EMBODIMENT

Figure 3:
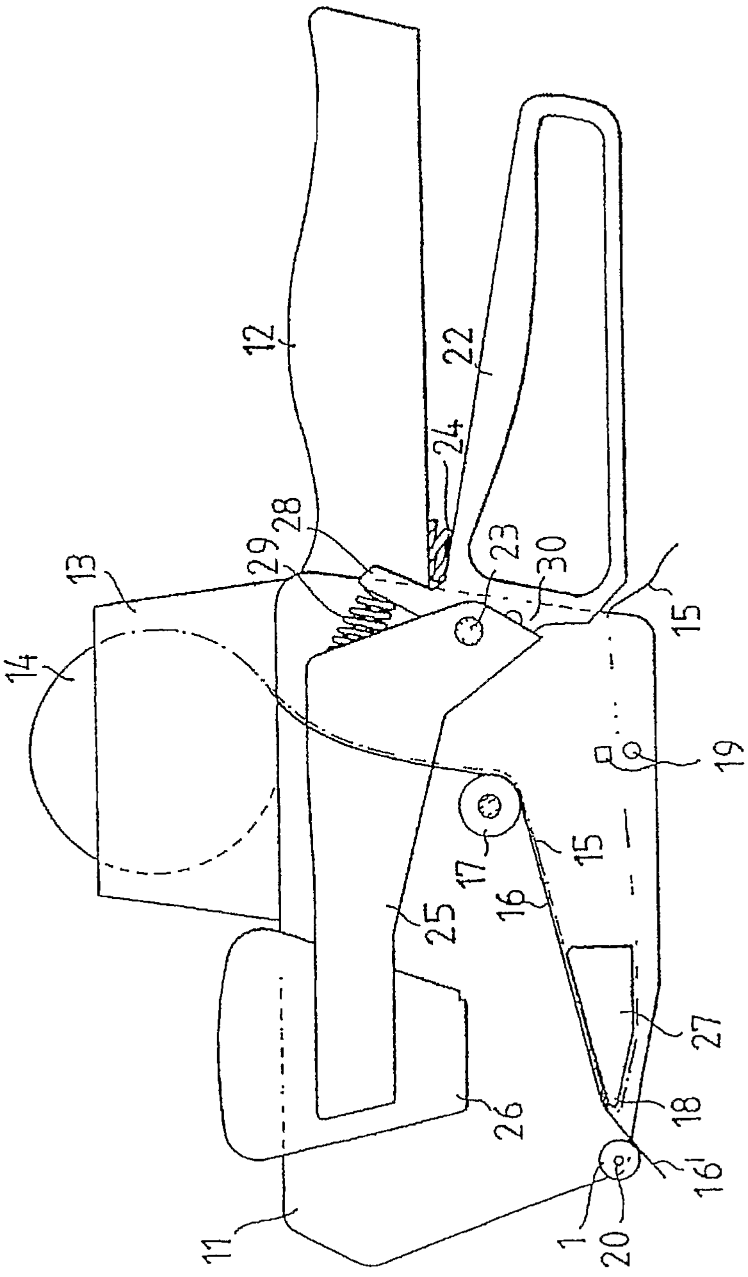
FIG. 3 shows a schematic view of a labeling apparatus provided with the applicator roll according to the invention.

A labeling apparatus shown in FIG. 3 has a housing 11 to which a handle 12 is fitted. On the upper side of the housing is a compartment 13 for accommodating a supply roll 14 of self-adhesive labels 16 adhering to a carrier web 15. The carrier web 15 first passes downward in the labeling apparatus out of the compartment 13 and then, after being deflected by a roller 17, moves forward to a dispensing edge 18 at which the carrier web is deflected and directed past a schematically illustrated feeding mechanism 19 to the rear of the housing 11. An applicator roll 1 is rotatably mounted on a hub 20 in front of the dispensing edge 18 inside the housing 11. It enables a label 16', when in dispensing position after being detached from the carrier web 15 at the dispensing edge 18, to be adhered to an article through a rolling action of the applicator roll 1.

An actuating lever 22 rotatably mounted on a hub 23 is attached underneath the handle 12. Seated between the handle 12 and the actuating lever 22 is a spring 24 which always tries to urge the actuating lever 22 into the position of rest shown in FIG. 3. A printing mechanism lever 25 also located in the housing 11 is likewise rotatably mounted on the hub 23. This printing mechanism lever 25 supports a printing mechanism 26 for printing data on a self-adhesive label 16 resting on a platen 27. A spring 29 is seated between an arm 28 of the actuating lever 22 and the printing mechanism lever 25. The spring 29 serves the function of transferring a movement of the actuating lever 22 directed at the handle 12 onto the printing mechanism lever 25.

In the position of rest illustrated in FIG. 3, the printing mechanism lever 25 is held in the elevated position by a lug 30 formed on the actuating lever 22.

For a brief description of an operating cycle of the apparatus shown in FIG. 3 it is assumed that no self-adhesive label 16' has yet arrived in the dispensing position underneath the applicator roll 1. To initiate an operating cycle the actuating lever 22 is pulled against the handle 12, as the result of which the printing mechanism lever 25 is swiveled around the hub 23 in the anticlockwise direction on account of the action of the arm 28 and the spring 29, causing the printing mechanism 26 to be lowered onto the platen 27. When the printing mechanism 26 impacts on the platen 27, it produces a print on the self-adhesive label 16 lying on the platen 27 at this particular instant. At the same time the feeding mechanism 19 is moved by a lever connection, not shown, from the position shown in FIG. 3 toward the platen 27 along the carrier web 15. When the actuating lever 22 is released, the spring 24 returns the actuating lever to the initial position shown in FIG. 3, whereby the lug 30 swivels the printing mechanism lever 25 around the hub 23 back to its illustrated initial position. At the same time the feeding mechanism 19 is also moved back to its initial position shown in FIG. 3; during this movement, however, it is firmly engaged with the carrier web 15, causing the web to be pulled around the dispensing edge 18 by a distance equivalent to the length of one self-adhesive label 16. As this occurs, a self-adhesive label 16 detaches from the carrier web 15 at the dispensing edge 18 and adopts the position of the self-adhesive label 16' underneath the applicator roll 1. The self-adhesive label 16' can now be adhered to an article through a rolling action of the applicator roll 1.

FIGS. 1*a*, 1*b* and 1*c*, as well as 2*a*, 2*b* and 2*c* respectively show a side view, a sectional view along the line Ib-Ib in FIG. 1*a* or along line IIb-IIb in FIG. 2*a*, and a perspective view of an applicator roll 1 as used in the labeling apparatus illustrated in FIG. 3. In its basic configuration the applicator roll 1 is comprised of a sleeve 31 rotatably mounted on the hub 20, which is rigidly secured to the housing 11. The sleeve 31 has a radially outwardly projecting profiled ring 32 positioned centrally in the sleeves longitudinal direction and integrally formed with the sleeve 31. Cylindrical jackets 34 are fitted to the sleeve 31 on either side of the profiled ring 32. Since both of the two cylindrical jackets 34 have the same design, to simplify matters in the FIGS. 1*a*, 1*b*, 1*c* and 2*a*, 2*b*, 2*c* only the respective right-hand cylindrical jacket 34 and the portion of the sleeve 31 associated with it have been provided with reference numerals. The two cylindrical jackets 34 are each equipped next to their outer ends 3 with an annular collar 33 protecting radially beyond the rest of the cylindrical jacket 34. The outer diameter of each cylindrical jacket 34 between the annular collar 33 and the opposite inner end face 36 is essentially constant. The outer diameter of the profiled ring 32 is roughly the same as that of the annular collars 33. The sleeve can be an extruded plastic part and, in the embodiment shown, is harder than the cylindrical jackets 34, which by contrast are made of a soft rubber or plastic. Since the material of the cylindrical jackets 34 is soft, the profiled ring 32 of the sleeve 31 and the two annular collars 33 of the cylindrical jackets 34, which are closer to the article to be labeled, are still guaranteed to press on the self-adhesive label, even if the labeling apparatus is not placed at exact right angles on the article needing to be marked, because these annular collars 33 yield accordingly due to their softness.

In the embodiment of the applicator roll 1 shown and described here in accordance with the invention, the two cylindrical jackets 34 on the sleeve 31 are axially displaceable and can be releasably, positively locked against axial shifting at several positions. This will now be described in more detail below.

For the positive lock between the sleeve 31 and each cylindrical jacket 34, an annular collar 38 integrally formed on the outer lateral surface of the sleeve 31 can be caused to engage free from backlash with an annular groove 40 formed in the inner lateral surface of the cylindrical jacket 34.

Furthermore, in the embodiment shown and described here the annular collar 38 is spaced apart from that axial end surface 37 of the profiled ring 32 which faces the annular collar, at a distance that is approximately equal to the length of the cylindrical jacket 34. In addition, an annular recess is provided in the outer end face 35 of the cylindrical jacket. This recess receives the annular collar 38 of the sleeve 31 for up to half its axial length, as illustrated in FIG. 2*b*. In this manner, each cylindrical jacket 34 is axially lockable between the profiled ring 32 and the annular collar 38. In this case, which is shown in FIGS. 2*a*, 2*b* and 2*c*, the applicator roll 1 is set for a narrow label format. Contrary to this, in FIGS. 1*a*, 1*b* and *c*, each cylindrical jacket 34 is spaced apart from the profiled ring 32 of the sleeve, since the applicator roll 1 is set for a wide label format. For this purpose the sleeve 31 is additionally provided with a second annular collar 39 spaced axially apart from the first annular collar 38, with the distance of the two annular collars 38, 39 being such that between themselves they can accommodate a third annular collar 42 formed on the cylindrical jacket 34 between its annular groove 40 and its outer end face 35. This is easily recognized in FIG. 1*b*.

The material of which the cylindrical jackets 34 are made is softer than the material of the sleeve 31, and it is so soft that the cylindrical jacket can yield on being moved axially, so that each cylindrical jacket 34 can be shifted from the position shown in FIGS. 1*a*, 1*b* and *c* into the position shown in FIGS. 2*a*, 2*b* and 2*c*, and vice versa.

In the embodiment shown the sleeve is provided with annular collars and the cylindrical jacket with annular grooves for accommodation of the annular collars. It is clear that the embodiment could also be reversed so that annular collars provided on the interior of the cylindrical jacket engage in the annular grooves provided in the sleeve.

Only the half of the applicator roll 1 shown on the right in the Figures has been described above, as the left half of the applicator roll in the Figures has a mirror-image but otherwise identical configuration.

Without further elaboration of the foregoing will so fully illustrate our invention that others may, by applying current or future knowledge, adapt the same for use under various conditions of service.

The invention claimed is:

1. An applicator roll for a labeling apparatus for paying out and applying self-adhesive labels, with which in each operating cycle a self-adhesive label in a dispensing position can be adhered to an object through a rolling action of the applicator roll, said applicator roll comprising:

a sleeve via which the applicator roll is rotatably mounted on a hub of the labeling apparatus, said sleeve having a first sleeve portion, a second sleeve portion and a profiled ring therebetween;

a first cylindrical jacket axially locked about said first sleeve portion in a first one of a plurality of positively locked positions against axial shifting between said first cylindrical jacket and said first sleeve portion;

a second cylindrical jacket axially locked about said second sleeve portion, said profiled ring arranged between the cylindrical jackets and projecting radially outwardly beyond the cylindrical jackets;

said first cylindrical jacket being axially displaceable on the first sleeve portion from the first one of the plurality of positively locked positions against axial shifting between said first cylindrical jacket and said first sleeve portion to a second one of the plurality of positively locked positions against axial shifting between said first cylindrical jacket and said first sleeve portion that is axially offset from the first one of the plurality of positively locked positions against axial shifting; and wherein said first cylindrical jacket is located between said profiled ring and an outer end of said first sleeve portion opposite an inner end connection with said profiled ring when said first cylindrical jacket is axially locked about said first sleeve portion in a first and second one of the plurality of positively locked positions.

2. The applicator roll according to claim 1, said first sleeve portion including one of at least one first annular collar and at least one annular groove, said first cylindrical jacket including the other one of the at least one first annular collar and the at least one annular groove, said at least one first annular collar being fitted within said at least annular groove to create a positive lock between the first sleeve portion and said first cylindrical jacket.

3. The applicator roll according to claim 2, wherein the first sleeve portion is equipped with the first annular collar at a distance from the profited ring, and that the first cylindrical jacket is provided with the first annular groove.

4. The applicator roll according to claim 3, wherein the first annular collar on the first sleeve portion is spaced from the profiled ring such that the first cylindrical jacket is axially lockable between the profiled ring and the first annular collar.

5. The applicator roll according to claim 3, wherein the first sleeve portion is provided with a second annular collar spaced apart from the first annular collar, with the distance between the two annular collars being such that they can accommodate between them a third annular collar formed on the first cylindrical jacket between its first annular groove and its outer end.

6. The applicator roll according to claim 5, wherein the first cylindrical jacket is provided with a fourth annular collar projecting radially outwardly.

7. The applicator roll according to claim 6, wherein the fourth annular collar is provided adjacent to the outer end faces of the first cylindrical jacket in the longitudinal direction of the sleeve.

8. The applicator roll according to claim 6, wherein the fourth annular collar is integrally formed with the first cylindrical jacket.

9. The applicator roll according to claim 1, wherein the sleeve and the profiled ring are made of plastic.

10. The applicator roll according to claim 1, wherein the profiled ring is arranged on the sleeve approximately in the center in the longitudinal direction of the sleeve.

11. The applicator roll according to claim 1, wherein the profiled ring is made of an ink-repellent material.

12. The applicator roll according to claim 1, wherein the cylindrical jackets are comprised of a soft rubber or plastic.

13. The applicator roll according to claim 1, wherein the sleeve and the profiled ring are made of a material that is harder than the cylindrical jackets.

14. The applicator roll according to claim 1, wherein the second cylindrical jacket is axially displaceable on the second sleeve portion and is releasably, positively locked in a plurality of predetermined axially offset positions against axial shifting between said second cylindrical jacket and said second sleeve portion.

15. The applicator roll according to claim 2, said profiled ring including a side wall facing the first cylindrical jacket, said first sleeve portion including one of the first annular collar and the first annular groove having a first wall and a second wall facing opposite the first wall, said first cylindrical jacket being axially locked about said first sleeve portion when said first cylindrical jacket abuts two of the side wall, the first wall and the second wall.

16. The applicator roll according to claim 2, said profiled ring including a side wall facing the first cylindrical jacket, said first sleeve portion including one of the first annular collar and the first annular groove having a first wall and a second wall facing opposite the first wall, said first cylindrical jacket being axially locked about said first sleeve portion when said first cylindrical jacket abuts the side wall the first wall and the second wall.

* * * * *